(12) United States Patent
Ogasawara et al.

(10) Patent No.: US 10,826,044 B2
(45) Date of Patent: Nov. 3, 2020

(54) CONDUCTIVE MODULE

(71) Applicant: Yazaki Corporation, Tokyo (JP)

(72) Inventors: Shigeyuki Ogasawara, Shizuoka (JP);
Michio Ota, Shizuoka (JP); Hideki Inoue, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 207 days.

(21) Appl. No.: 15/926,839

(22) Filed: Mar. 20, 2018

(65) Prior Publication Data
US 2018/0337386 A1    Nov. 22, 2018

(30) Foreign Application Priority Data

May 17, 2017 (JP) ................... 2017-098178

(51) Int. Cl.
| | |
|---|---|
| *H01M 2/20* | (2006.01) |
| *H01M 10/48* | (2006.01) |
| *H01R 13/50* | (2006.01) |
| *H01R 4/70* | (2006.01) |
| *H01M 2/10* | (2006.01) |

(52) U.S. Cl.
CPC ......... *H01M 2/206* (2013.01); *H01M 10/482* (2013.01); *H01M 10/486* (2013.01); *H01M 2/1077* (2013.01); *H01M 2220/20* (2013.01); *H01R 4/70* (2013.01); *H01R 13/501* (2013.01)

(58) Field of Classification Search
CPC ............. H01M 10/482; H01M 10/486; H01M 2220/20; H01M 2/1077; H01M 2/206; H01R 13/501; H01R 4/70
See application file for complete search history.

(56) References Cited

U.S. PATENT DOCUMENTS

2014/0057152 A1    2/2014  Furuya et al.

FOREIGN PATENT DOCUMENTS

JP            2013-4501 A         1/2013

*Primary Examiner* — Victoria H Lynch
(74) *Attorney, Agent, or Firm* — Kenealy Vaidya LLP

(57) ABSTRACT

The housing member includes a housing body that houses first and second conductive members, a lid body that closes an opening of a second housing chamber of the second conductive member in the housing body, a hinge body as a living hinge therebetween, and a holding mechanism that holds the lid body in the housing body at a closing position, the holding mechanism includes a first engagement holder having an inserted portion, and a second engagement holder having a claw portion.

15 Claims, 11 Drawing Sheets

CONDUCTIVE MODULE

CROSS-REFERENCE TO RELATED APPLICATION(S)

The present application claims priority to and incorporates by reference the entire contents of Japanese Patent Application No. 2017-098178 filed in Japan on May 17, 2017.

BACKGROUND OF THE INVENTION

1. Field of the Invention

The present invention relates to a conductive module.

2. Description of the Related Art

Conventionally, in a vehicle such as an electric vehicle or a hybrid vehicle, a battery pack that supplies electric power to a rotating machine as a driving source thereof is mounted. The battery pack is provided with a conductive module which is electrically connected to at least one of a plurality of battery cells constituting a battery module. The conductive module includes: a first conductive member electrically connected to an electrode terminal of a battery cell; a second conductive member electrically connected to each of the first conductive member and an electric connection object side; and a housing member that houses the first and second conductive members. The housing member includes: a housing body having a first housing chamber in which a first conductive member is to be housed and a second housing chamber in which a second conductive member is to be housed; a lid body that closes at least a part of an opening of the second housing chamber so that the second conductive member does not come out from the second housing chamber; a hinge body that makes the lid body pivot with respect to the housing body between an opening position with respect to the opening of the second housing chamber and a closing position with respect to the opening of the second housing chamber; and a holding mechanism that holds the lid body in the housing body at the closing position. This housing member is formed of an insulating material such as a synthetic resin, and a thin, so-called living hinge having flexibility is formed as a hinge body. Furthermore, the holding mechanism includes: a first engagement holder on a lid body side, the first engagement holder having a claw portion; and a second engagement holder on a housing body side, the second engagement holder having an inserted portion into which the claw portion is inserted, the claw portion being hooked on a wall surface of the inserted portion as an insertion of the claw portion into the inserted portion is completed. In this holding mechanism, the claw portion of the first engagement holder is guided to the inserted portion along an introduction portion of the second engagement holder in accordance with a pivoting motion toward the closing position of the lid body with respect to the housing body. This type of conductive module is disclosed, for example, in the following Japanese Patent Application Laid-open No. 2013-4501. Japanese Patent Application Laid-open No. 2013-4501 discloses a so-called bus bar module including a bus bar as a first conductive member and an electric wire as a second conductive member, and configured to connect respective battery cells in series or in parallel by a plurality of bus bars while detecting the voltage of the battery cells with the electric wire.

By the way, the hinge body of this conductive module does not necessarily define one pivot axis because of a flexibility of the hinge body, and there is a possibility that the position of the pivot axis is displaced between a housing body side and a lid body side. Therefore, in the housing member, a pivoting locus of the lid body with respect to the housing body changes each time the pivoting motion is performed, and along with this change, a pivoting locus of the claw portion of the first engagement holder with respect to the introduction portion of the second engagement holder also changes. Accordingly, in order to insert the claw portion into the inserted portion, it is necessary for the housing member to make the lid body pivot toward the closing position while being conscious of the positional relationship between the claw portion of the first engagement holder and the introduction portion of the second engagement holder. That is, the conventional conductive module has room for improvement concerning the engaging operation of the holding mechanism.

SUMMARY OF THE INVENTION

Accordingly, it is an object of the present invention to provide a conductive module capable of improving engagement workability of a holding mechanism when closing an opening of a housing body with a lid body.

A conductive module according to one aspect of the present invention includes a first conductive member electrically connected to one of two electrode terminals of battery cells as a connection target with at least one of an arranged plurality of the battery cells being the connection target; a second conductive member that has a conductor extending in a direction in which the plurality of battery cells are arranged, the second conductive member being configured to electrically connect the first conductive member and an electric connection object with the conductor; and a housing member that houses the first and second conductive members, wherein the housing member includes: a housing body having a first housing chamber in which the first conductive member is housed and a second housing chamber in which the second conductive member is housed; a lid body that closes at least a part of an opening of the second housing chamber so that the second conductive member does not come out from the second housing chamber; a hinge body that connects the housing body and the lid body, and rotates the lid body with respect to the housing body between an opening position of the second housing chamber with respect to the opening and a closing position of the second housing chamber with respect to the opening; and a holding mechanism that holds the lid body in the housing body at the closing position, the hinge body is a thin living hinge having flexibility capable of displacing a position of a pivot axis between a housing body side and a lid body side, the holding mechanism includes a first engagement holder provided in the housing body and a second engagement holder provided in the lid body, and is formed so as to hold the lid body in the housing body at the closing position by inserting a claw portion of one of the first engagement holder and the second engagement holder into an inserted portion of the other of the first engagement holder and the second engagement holder, and by hooking the claw portion and a wall surface of the inserted portion as an insertion of the claw portion into the inserted portion is completed, and the first engagement holder includes a first introduction portion that comes into contact with the second engagement holder when the pivot axis of the hinge body is positioned at a reference pivot axis between the housing body side and the lid body side, and guides the second engagement holder so that the claw portion is inserted into the inserted portion as a pivoting motion of the lid body with respect to the containing body proceeds, and a second introduction portion that comes into contact with the second engagement holder even if the pivot axis of the hinge body is positioned at any position between the housing body side and the lid body side, and guides the second engagement holder to the first introduction portion as the pivoting motion of the lid body with respect to the housing body proceeds.

According to another aspect of the present invention, it is preferable that the second introduction portion is a sliding contact surface that guides the contacted second engagement holder while keeping a contact state until the second engagement holder reaches the first introduction portion.

According to still another aspect of the present invention, it is preferable that the second introduction portion is an inclined surface inclined with respect to a guiding direction of the second engagement holder by the first introduction portion.

According to still another aspect of the present invention, it is preferable that the second housing chamber includes an inner wall portion on a side of the pivoting axis, the hinge body at a wall portion forming the second housing chamber being connected to the inner wall portion, and an outer wall portion that is disposed with a space therebetween across an interior of the second housing chamber with respect to the inner wall portion, the lid body includes an inner end portion on a side of the pivoting axis to which the hinge body is connected, and an outer end portion arranged with a space from the inner end portion, and in the holding mechanism, the first engagement holder is provided on the outer wall portion, and the second engagement holder is provided at the outer end portion.

According to still another aspect of the present invention, it is preferable that the second housing chamber includes an inner wall portion on a side of the pivoting axis, the hinge body at a wall portion forming the second housing chamber being connected to the inner wall portion, and an outer wall portion that is disposed with a space therebetween across an interior of the second housing chamber with respect to the inner wall portion, the lid body includes an inner end portion on a side of the pivoting axis to which the hinge body is connected, and an outer end portion arranged with a space from the inner end portion, and the holding mechanism is arranged between the outer wall portion and the outer end portion and is also arranged between the inner wall portion and the inner end portion.

According to still another aspect of the present invention, it is preferable that the second conductive member is an electric wire including a core wire as the conductor and a coating covering the core wire.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, embodiments of a conductive module according to the present invention will be described in detail with reference to the drawings. It should be noted that the present invention is not limited by this embodiment.

Embodiment

One embodiment of a conductive module according to the present invention will be described with reference to FIGS. 1 to 11.

Figure 1:
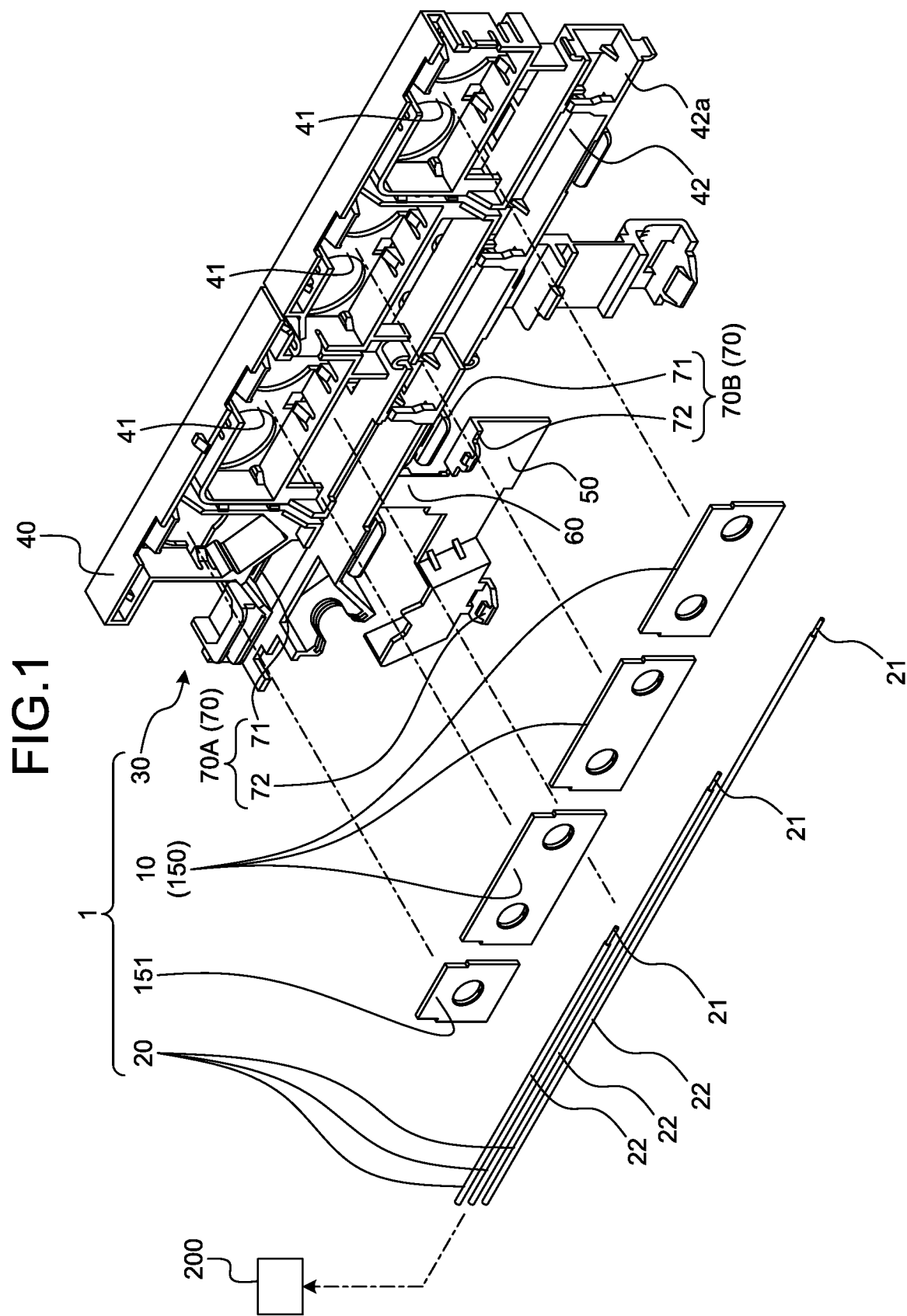
FIG. 1 is an exploded perspective view of a conductive module according to an embodiment.

Reference numeral 1 in FIG. 1 illustrates a conductive module according to the present embodiment. The conductive module 1 is electrically connected to at least one of the plurality of battery cells 120 forming the battery module 110 (FIG. 2), and forms the battery pack 100 together with the battery module 110. The battery pack 100 is mounted in a vehicle (such as an electric vehicle or a hybrid vehicle) having a rotating machine as a drive source, and is used for supplying power to the rotating machine or the like. First, a connection target of the conductive module 1 will be described. Note that the conductive module 1 in FIG. 1 and the battery module 110 in FIG. 2 are illustrated by extracting parts thereof.

Figure 2:
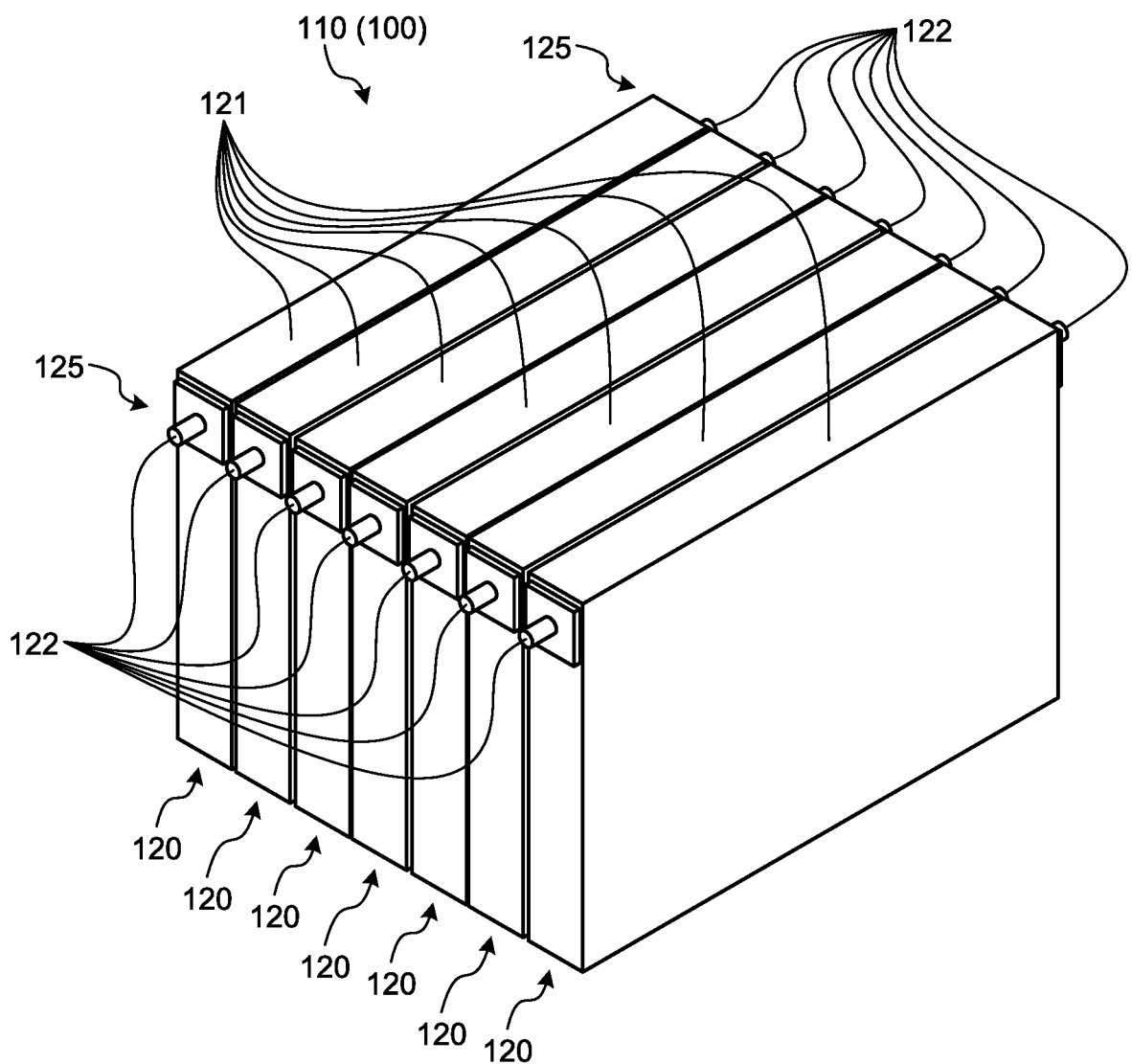
FIG. 2 is a perspective view illustrating a battery module.
Figure 3:
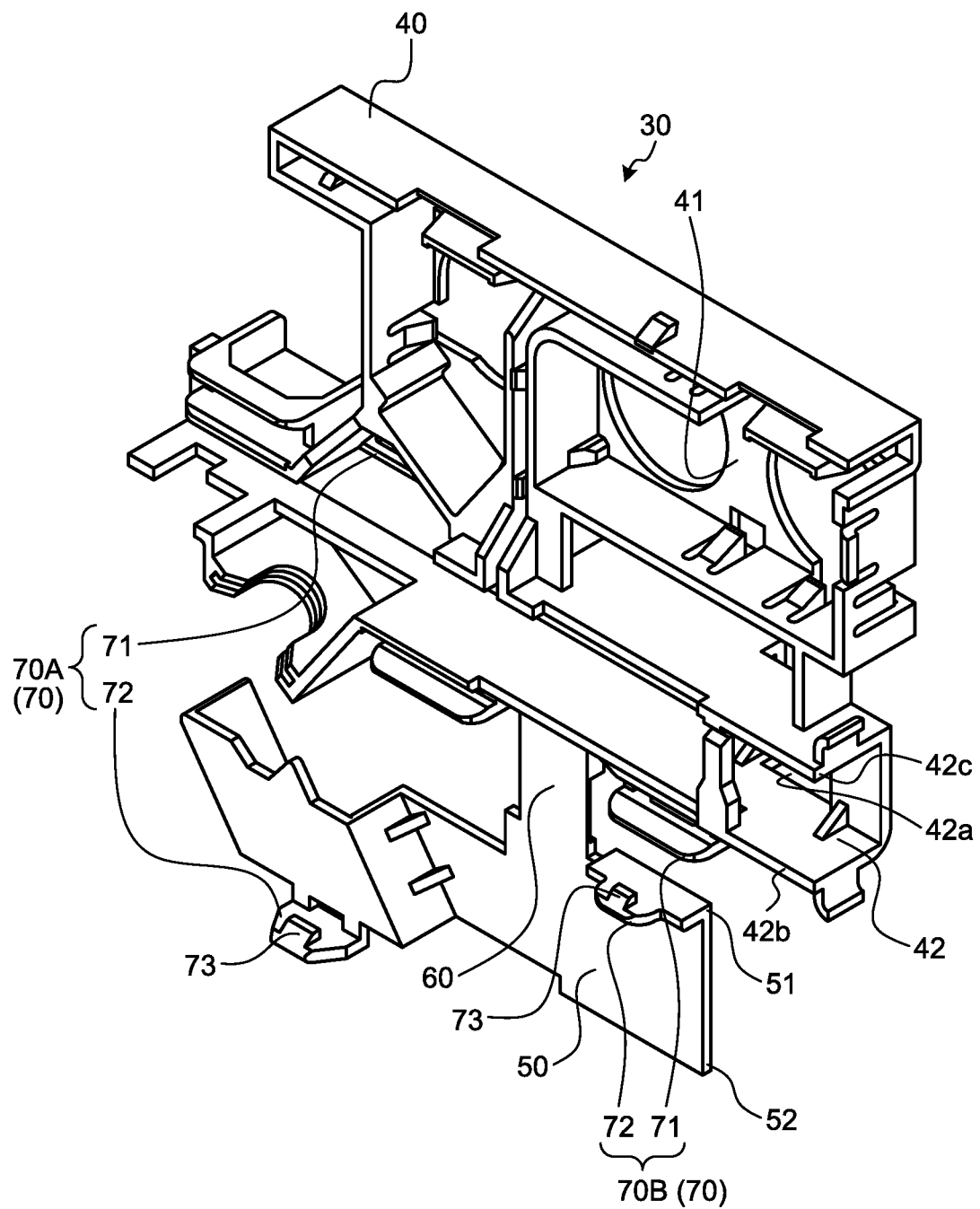
FIG. 3 is a perspective view illustrating a part of a housing member with a lid body being opened.
Figure 4:
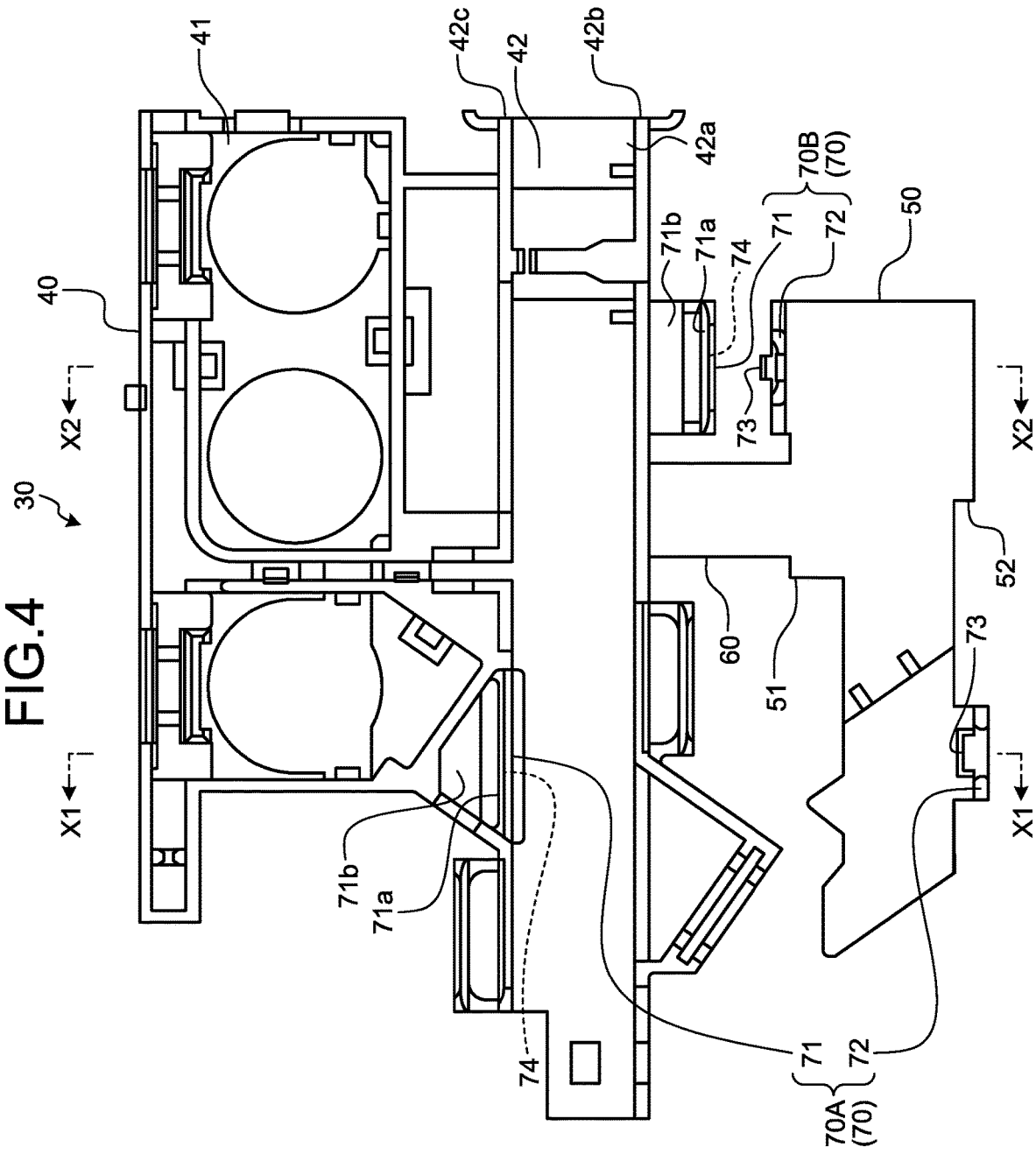
FIG. 4 is a plan view illustrating a part of the housing member with the lid body being opened.
Figure 5:
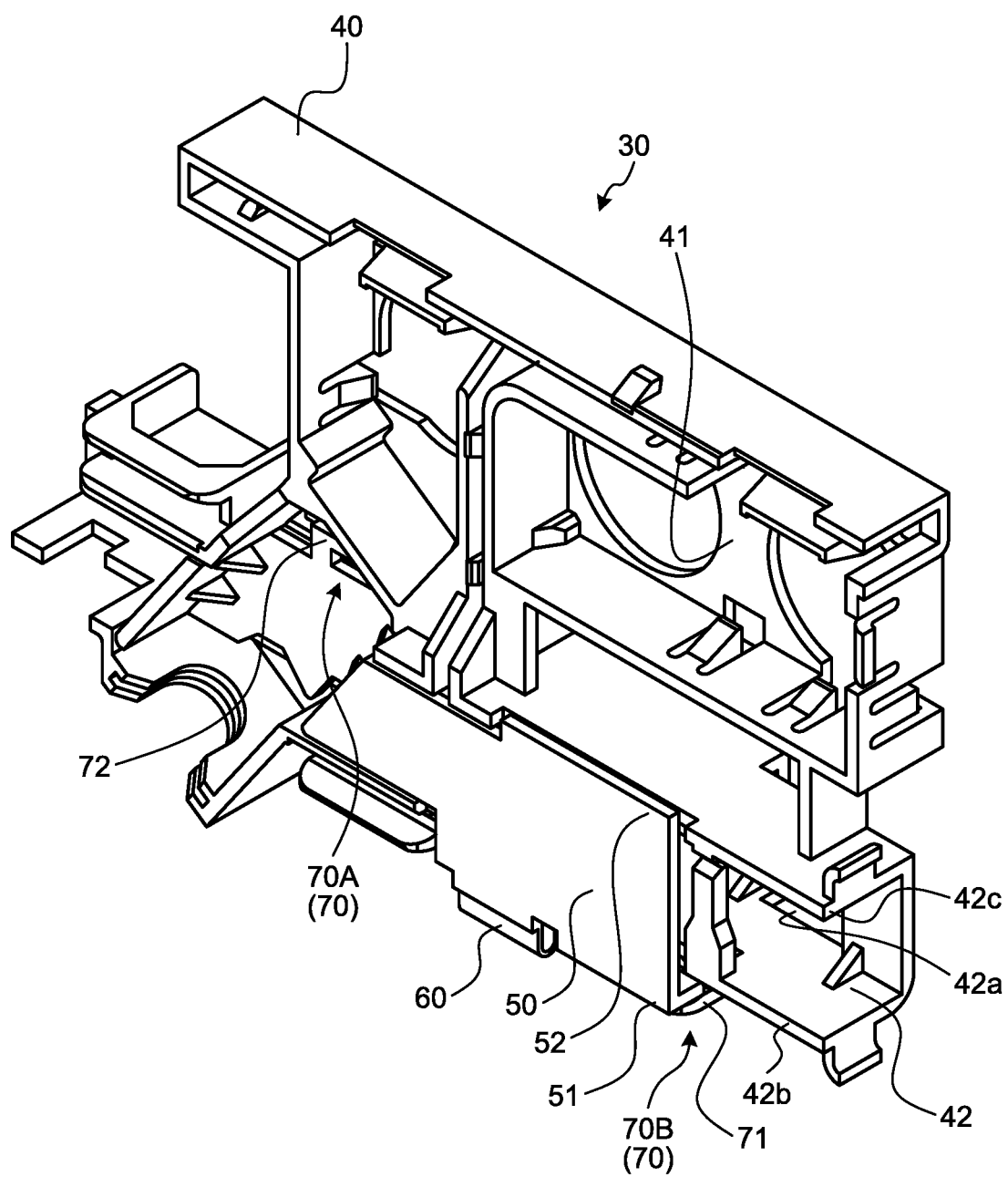
FIG. 5 is a perspective view illustrating a part of the housing member with the lid body being closed.
Figure 6:
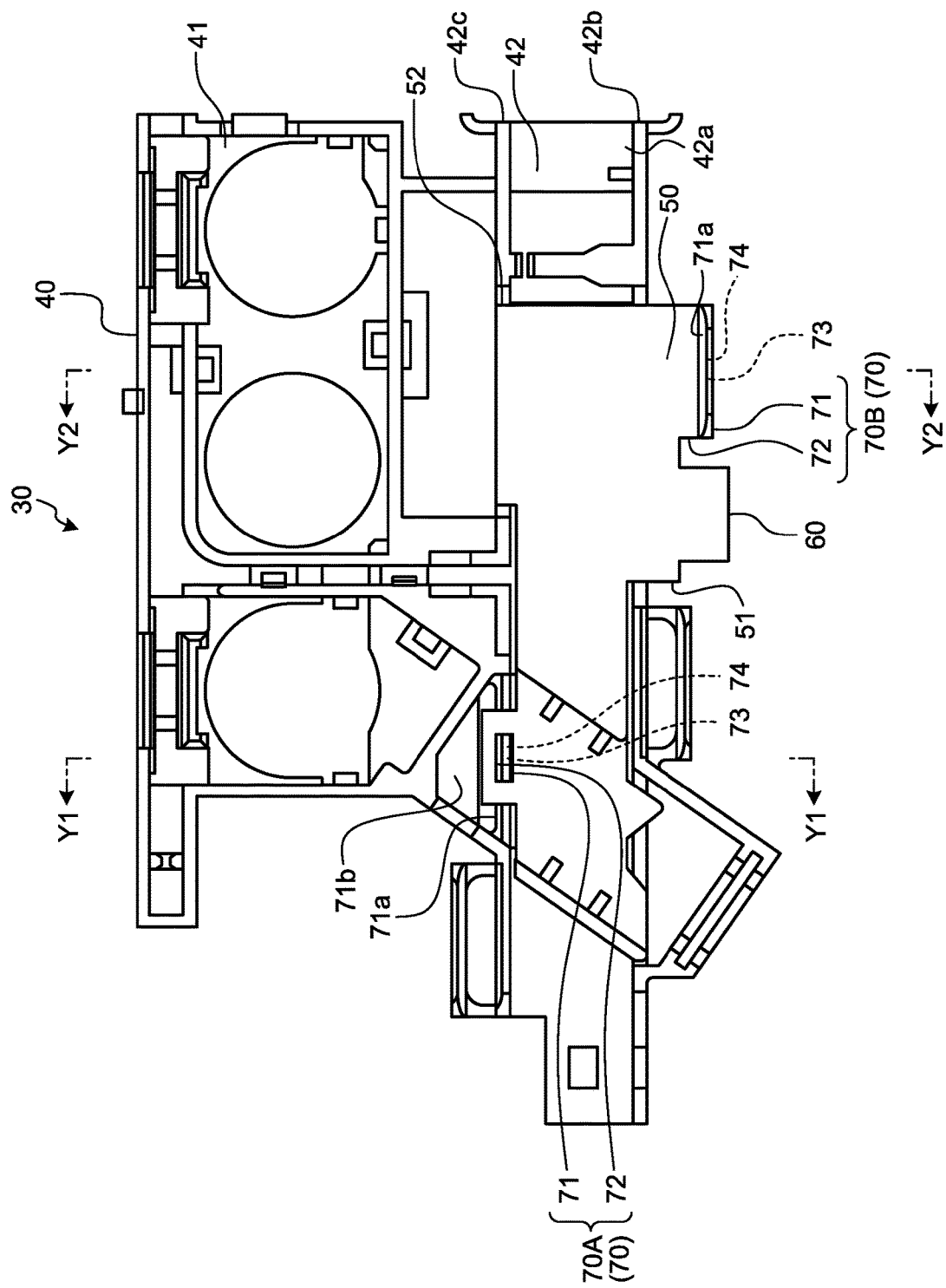
FIG. 6 is a plan view illustrating a part of the housing member with the lid body being closed.
Figure 7:
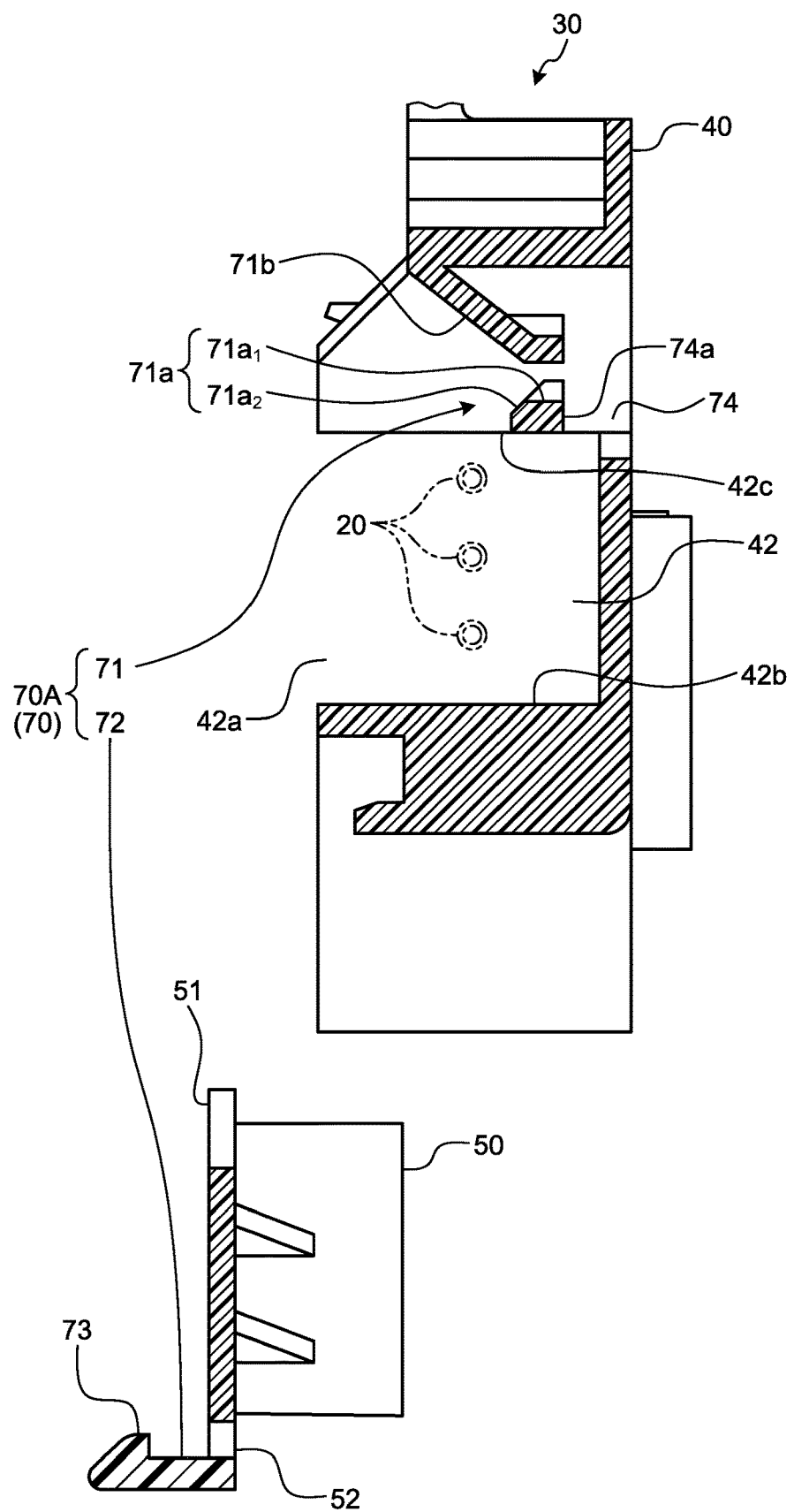
FIG. 7 is a cross-sectional view taken along a line X1-X1 of FIG. 4 and is an enlarged view of a holding mechanism.
Figure 8:
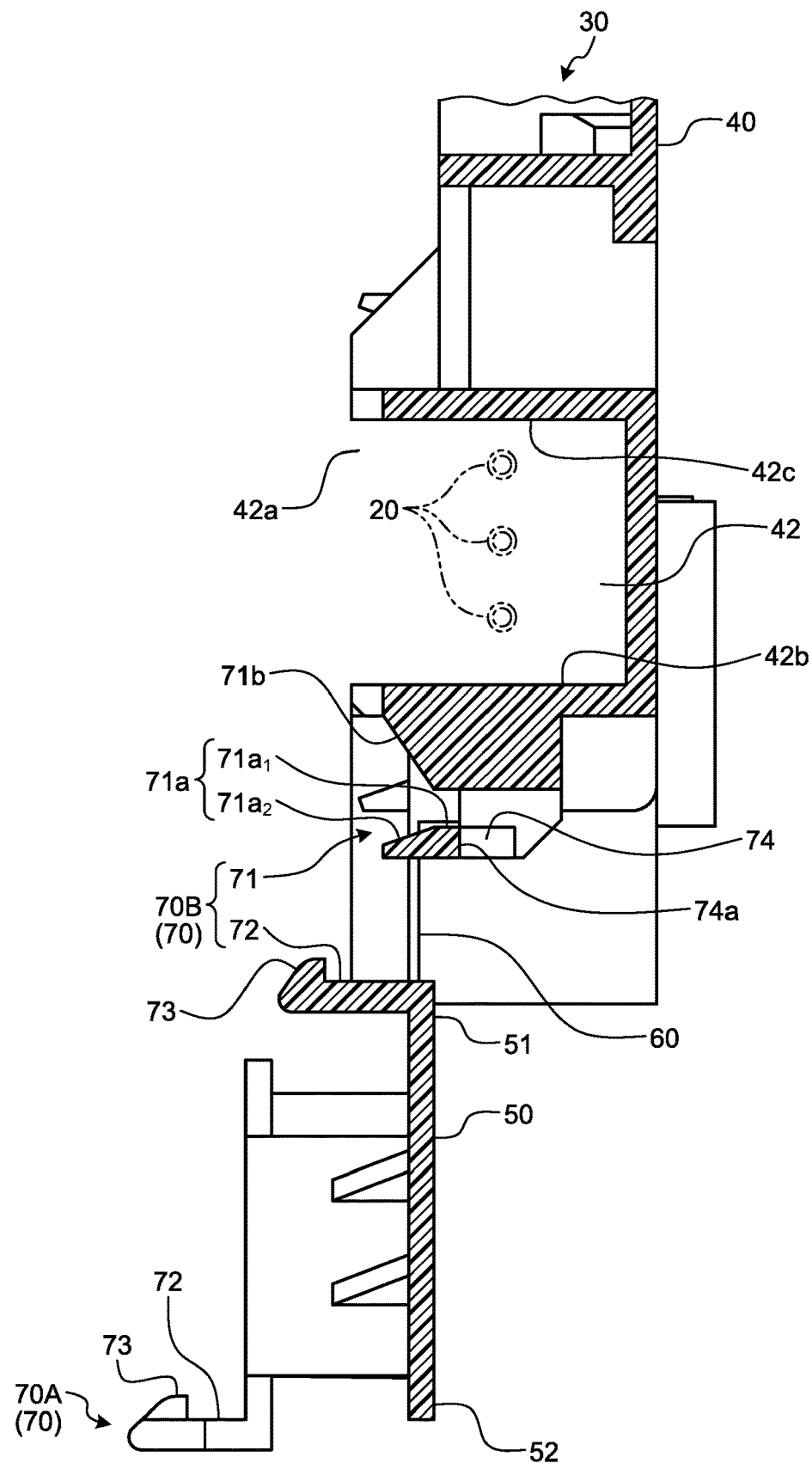
FIG. 8 is a cross-sectional view taken along a line X2-X2 of FIG. 4 and is an enlarged view of the holding mechanism.
Figure 9:
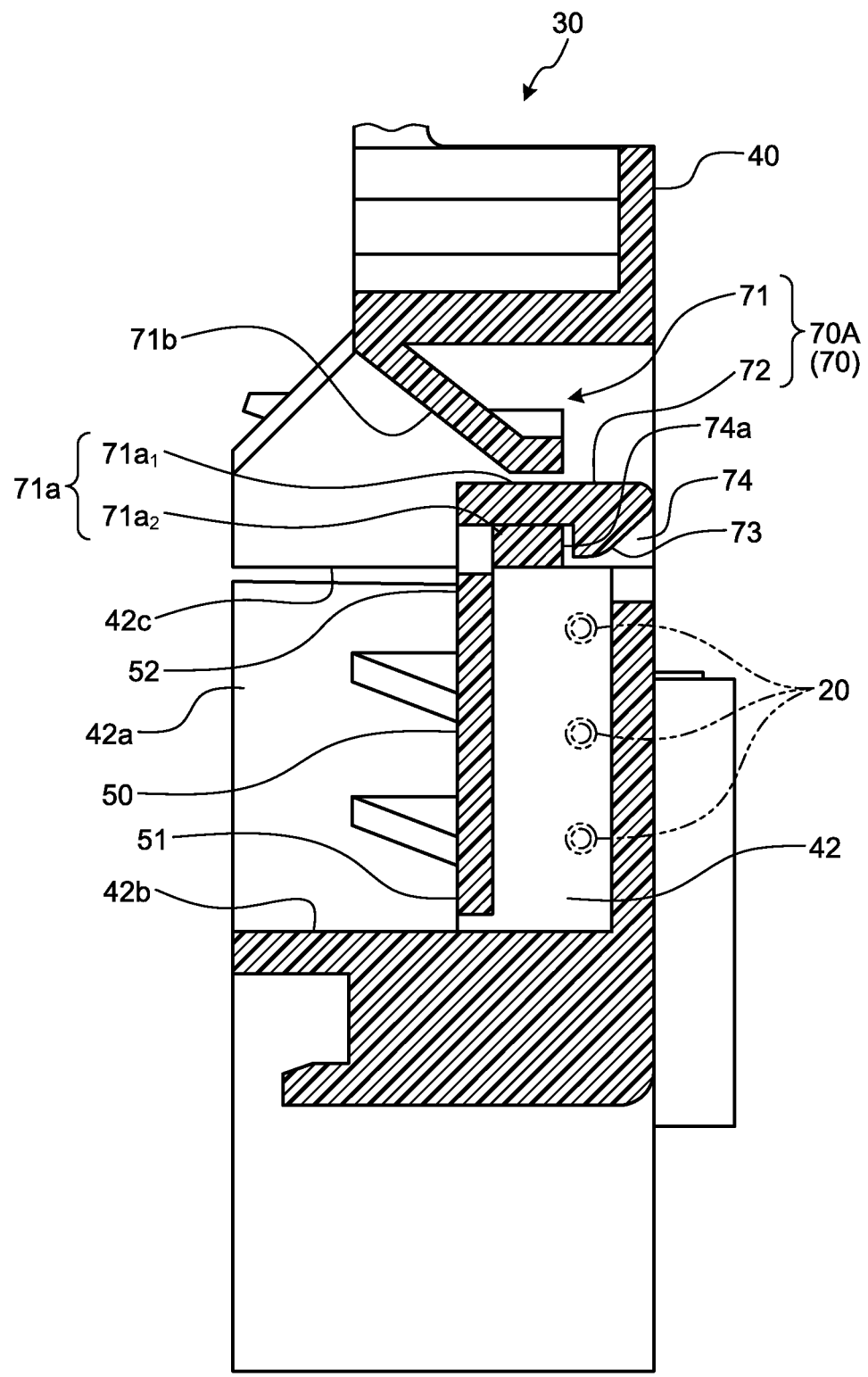
FIG. 9 is a cross-sectional view taken along a line Y1-Y1 of FIG. 6 and is an enlarged view of the holding mechanism.

The battery cell 120 includes the cell body 121 and two electrode terminals 122 (FIG. 2). Each of the electrode terminals 122 is provided at any position of the cell body 121 in a state of being exposed to the outside, one of the electrode terminals 122 is a positive electrode, and the other of the electrode terminals 122 is a negative electrode. Each of the electrode terminals 122 may be, for example, a plate-like member provided on an outer wall surface of the cell body 121, or a columnar pillar column protruding from the outer wall surface of the cell body 121. In the battery cell 120, when the cell body 121 has a plurality of outer wall surfaces, each electrode terminal 122 may be arranged on one outer wall surface, and the outer wall surface on which the electrode terminal 122 is arranged may be divided for each electrode terminal 122. In the battery module 110, each of the battery cells 120 is arranged in a row with one electrode terminal 122 of each battery cell 120 arranged in a line and the other electrode terminal 122 also arranged in a line. Therefore, in this battery module 110, electrode terminal groups 125 including the electrode terminals 122 arranged in a line are provided at two places.

In this battery module 110, two electrode terminals 122 adjacent to each other in an arrangement direction of the battery cells 120 are connected to each electrode terminal group 125 by a conductive bus bar 150 (FIG. 1). The bus bar 150 is molded from a conductive material such as metal. By disposing the bus bar 150 for every combination of the two adjacent electrode terminals 122, the two electrode terminals 122 are physically and electrically connected for each combination. The bus bar 150 in this embodiment is formed in a rectangular flat plate shape, and the plurality of bus bars 150 are arranged for each electrode terminal group 125 along the arrangement direction of the battery cells 120. For example, when the electrode terminal 122 has a plate shape, the bus bar 150 is physically and electrically connected to the electrode terminal 122 by welding (laser welding or the like). On the other hand, when the electrode terminal 122 is a pillar column, a through hole through which each electrode terminal 122 is inserted is formed in the bus bar 150. By fixing the bus bar 150 to the electrode terminal 122 with screws or the like, the bus bar 150 and the electrode terminal 122 are physically and electrically connected to each other. In this battery module 110, two electrode terminals 122 which are not connected by the bus bar 150 exist, one of the electrode terminals 122 is a so-called total positive electrode, and the other of the electrode terminals 122 is a so-called total negative electrode. In the total positive electrode and the total negative electrode, in the case where the electrode terminal 122 is a pillar column, one bus bar 151 is provided with a through hole. The bus bar 150 and the bus bar 151 are also housed in a housing member 30 which will be described later.

For example, in the battery cell 120 of the present embodiment, the cell body 121 forms a rectangular parallelepiped. Therefore, the battery module 110 of the present embodiment virtually forms a rectangular parallelepiped by the respective battery cells 120, and has six wall surfaces of an aggregate including the plurality of battery cells 120 along the arrangement direction of the plurality of battery cells 120. In the battery cell 120 of the present embodiment, stud bolts are vertically provided from two opposing outer wall surfaces of the cell body 121, and each of the stud bolts is used as the electrode terminal 122. Therefore, in the battery module 110 of the present embodiment, the electrode terminal group 125 is provided in each of the opposing two of the six wall surfaces forming the rectangular parallelepiped. The bus bar 150 of the present embodiment has a through hole through which two adjacent electrode terminals 122 are inserted. For example, in the vehicle, the battery module 110 is mounted such that an axis direction of each electrode terminal 122 is orthogonal to a vehicle vertical direction.

The conductive module 1 of the present embodiment is connected to at least one of the respective electrode terminal groups 125 with respect to the battery module 110 configured as described above.

The conductive module 1 includes a first conductive member 10, a second conductive member 20, and a housing member 30 that houses the first and second conductive members 10 and 20 (FIG. 1). The conductive module 1 may include at least one first conductive member 10 and at least one second conductive member 20. In this embodiment, the plurality of first conductive members 10 and the plurality of second conductive members 20 are provided.

The first conductive member 10 is formed of a conductive material such as metal. With at least one of the plurality of battery cells 120 arranged as the battery module 110 being a connection target, the first conductive member 10 is electrically connected to one of the two electrode terminals 122 of the battery cell 120 as the connection target. In the first conductive member 10, an electrical connection with the electrode terminal 122 may be direct or indirect. In the former case where the first conductive member 10 is directly (that is, physically) and electrically connected to the electrode terminal 122, for example, by forming a through hole in the flat first conductive member 10 and inserting the electrode terminal 122 into the through hole, the first conductive member 10 may be fastened to the electrode terminal 122 together with the bus bar 150. In this case, the bus bar 150 itself may be used as the first conductive member 10. On the other hand, in the latter case where the first conductive member 10 is indirectly connected to the electrode terminal 122, for example, the first conductive member 10 may be formed so as to be physically and electrically connected to the bus bar 150 by welding (laser welding or the like) and may be electrically connected to the electrode terminal 122 via the bus bar 150. In this embodiment, the bus bar 150 itself is used as the first conductive member 10.

The second conductive member 20 is formed of a conductive material such as metal. The second conductive member 20 has a conductor 21 extending in the arrangement direction of the plurality of battery cells 120 and electrically connects the conductor 21 to the first conductive member 10 and the electric connection object 200 (FIG. 1). The second conductive member 20 directly or indirectly connects the conductor 21 to the first conductive member 10 or the electric connection object 200, thereby establishing electric connection between the conductor 21 and the first conductive member 10 and between the conductor 21 and the electric connection object 200. For example, in the case of direct connection, by fastening a metal terminal (not illustrated) attached to the conductor 21 to the electrode terminal 122 together with the first conductive member 10, and by welding (laser welded or the like) the conductor 21 to the first conductive member 10, the conductor 21 and the first conductive member 10 may be physically and electrically connected. In the case of indirect connection, a third conductive member (not illustrated) may be interposed between the conductor 21 and the first conductive member 10 to electrically connect the conductor 21 and the first conductive member 10. As the third conductive member, for example, application of a circuit protection member (fuse or the like) having a fusible member is conceivable. In this embodiment, an electric wire including the conductor 21 serving as a core wire and a coating 22 covering the conductor 21 is used as the second conductive member 20. It should be noted that the core wire may be a rod-like conductor formed into a columnar shape, or may be a bundle of a plurality of strands (for example, a twisted wire formed by twisting a plurality of strands).

Here, the exemplary electric connection object 200 is a battery monitoring unit that monitors the battery state (voltage, current, temperature, and the like) of the battery cell 120. For example, an electric wire as the second conductive member 20 is provided as a voltage detection line that detects the voltage of the battery cell 120.

The housing member 30 is formed of an insulating material such as a synthetic resin. The housing member 30 has a housing body 40 in which the first and second conductive members 10 and 20 are to be housed (FIGS. 1, 3 to 6). The housing body 40 has a first housing chamber 41 in which the first conductive member 10 is to be housed and a second housing chamber 42 in which the second conductive member 20 is to be housed. The first housing chamber 41 is provided for each first conductive member 10. On the other hand, the second housing chamber 42 is provided as a single room in which the plurality of second conductive members 20 led from the respective first housing chambers 41 are to be housed. In this housing member 30, the respective first housing chambers 41 are arranged side by side in the arrangement direction of the plurality of battery cells 120, and the second conductive members 20 extend along the arrangement direction of the plurality of battery cells 120.

Furthermore, the housing member 30 includes a lid body 50 that closes at least a part of an opening 42a of the second housing chamber 42 so that the second conductive member 20 does not come out from the second housing chamber 42, and a hinge body 60 that connects the housing body 40 and the lid body 50, and makes the lid body 50 pivot with respect to the housing body 40 between an opening position (FIGS. 1, 3 and 4) with respect to the opening 42a of the second housing chamber 42 and a closing position (FIGS. 5 and 6) with respect to the opening 42a of the second housing chamber 42 (FIG. 1, FIG. 3 to FIG. 6).

In this housing member 30, the housing body 40, the lid body 50, and the hinge body 60 are integrally molded. Therefore, the hinge body 60 is formed as a so-called living hinge. A living hinge is a thin portion having flexibility formed between the housing body 40 and the lid body 50, in which the position of the pivot axis can be displaced between the housing body 40 side and the lid body 50 side. An exemplified hinge body 60 has flexibility enough to enable pivoting between the housing body 40 and the lid body 50, and is formed to be a rectangular thin flat plate. In addition, the hinge body 60 of this embodiment connects the opening 42a of the second housing chamber 42 of the housing body 40 and the lid body 50. The hinge body 60 is in the form of a flat plate in the initial state, and the lid body 50 can be made to pivot with respect to the housing body 40 by bending. In this embodiment, a relative positional relationship between the housing body 40 and the lid body 50 in the initial state of the hinge body 60 is set as an opening position. In addition, in the hinge body 60, the pivot axis is displaced between the housing body 40 side and the lid body 50 side according to the bending position.

The second housing chamber 42 and the lid body 50 have proximity portions that are proximate to each other when the lid body 50 closes the opening 42a of the second housing chamber 42. The respective proximity portions of the second housing chamber 42 and the lid body 50 may be in contact with each other. The second housing chamber 42 and the lid body 50 each have at least two proximity portions, and the proximity portions thereof are opposed to each other via the opening 42a.

The proximity portion of the second housing chamber 42 is provided in a wall portion forming the second housing chamber 42. For example, the second housing chamber 42 includes a pivot axis side (hereinafter referred to as "inner wall portion") 42b to which the hinge body 60 at the wall part is connected, and a wall portion (hereinafter referred to as "outer wall portion") 42c arranged with a space therebetween across an interior of the second housing chamber 42 with respect to the inner wall portion 42b (FIGS. 3 to 6). In the second housing chamber 42, the proximity portion is provided to the inner wall portion 42b and the outer wall portion 42c. The proximity portion of the second housing chamber 42 is provided on, for example, the peripheral edge portion of the opening 42a of the second housing chamber 42 which is a part of the inner wall portion 42b and the outer wall portion 42c, or provided closer to an interior side or the like than the peripheral edge portion of the opening 42a in the inner wall portion 42b and the outer wall portion 42c.

The proximity portion of the lid body 50 is provided at a peripheral end portion proximate to the inner wall portion 42b and the outer wall portion 42c of the second housing chamber 42 at the closing position. For example, the lid body 50 includes an end portion (hereinafter referred to as "inner end portion") 51 on the side of the pivot axis, the hinge body 60 at the peripheral end portion thereof being connected to the end portion 51, and an end portion (hereinafter referred to as "outer end portion") 52 arranged with a space from the inner end portion 51 (FIGS. 3 to 6). The inner end portion 51 and the outer end portion 52 are arranged at a position separated from the interior of the second housing chamber 42 in the closing position. The lid body 50 has the inner end portion 51 and the outer end portion 52 as a proximity portion (FIGS. 3 to 6). In the closing position, the inner end portion 51 is proximate to the inner wall portion 42b of the second housing chamber 42, and the outer end portion 52 is proximate to the outer wall portion 42c of the second housing chamber 42.

Still further, the housing member 30 has a holding mechanism 70 that holds the lid body 50 to the housing body 40 at the closing position (FIGS. 1, 3 to 10). In the housing member 30, the holding mechanism 70 is also integrally formed with the housing body 40, the lid body 50, and the hinge body 60.

The holding mechanism 70 includes a first engagement holder 71 provided in the housing body 40 and a second engagement holder 72 provided in the lid body 50 (FIGS. 1, 3, and 4 to 10). The holding mechanism 70 is formed such that a claw portion 73 of one of the first engagement holder 71 and the second engagement holder 72 is inserted into an inserted portion 74 of the other of the first engagement holder 71 and the second engagement holder 72, and the lid body 50 is held by the housing body 40 at the closing position by hooking the claw portion 73 and a wall surface 74a of the inserted portion 74 with each other as an insertion of the claw portion 73 into the inserted portion 74 is completed (FIGS. 7 to 10). The claw portion 73 and the wall surface 74a may be brought into contact with each other at the closing position, and may be brought into contact with each other with movement of the lid body 50 toward the opening position side at the closing position. For example, when the hinge body 60 is returning to the original shape at the closing position, the claw portion 73 and the wall surface 74a come into contact with each other. The claw portion 73 is formed as a claw-shaped protruding portion on one of the first engagement holder 71 and the second engagement holder 72. The inserted portion 74 is a groove or a through hole formed in the other of the first engagement holder 71 and the second engagement holder 72, and one of the plurality of wall surfaces forming the groove or the through hole is the wall surface 74a on which the claw portion 73 is hooked. In the holding mechanism 70, the second engagement holder 72 also pivots with respect to the first engagement holder 71 in accordance with the pivoting motion of the lid body 50 with respect to the housing body 40 by the hinge body 60, and the claw portion 73 is inserted into the inserted portion 74. In this embodiment, the inserted portion 74 is provided in the first engagement holder 71 and the claw portion 73 is provided in the second engagement holder 72.

Figure 10:
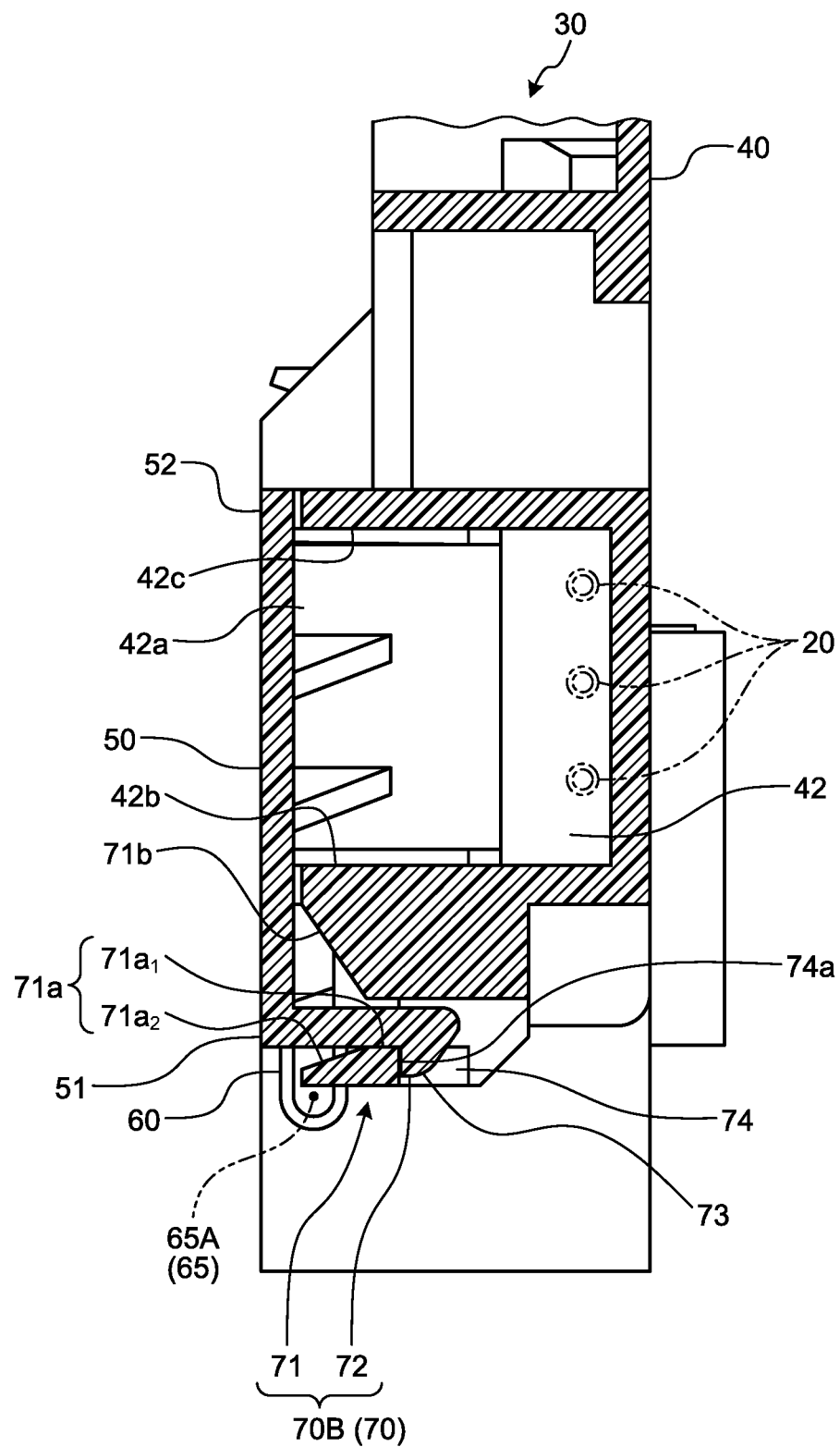
FIG. 10 is a cross-sectional view taken along a line Y2-Y2 in FIG. 6 and is an enlarged view of the holding mechanism.

Here, as described above, the position of the pivot axis 65 of the hinge body 60 is displaced between the housing body 40 side and the lid body 50 side due to its flexibility. However, in the holding mechanism 70, in order to maintain an engagement state between the claw portion 73 and the inserted portion 74, the first engagement holder 71 and the second engagement holder 72 are formed so that the claw portion 73 is inserted into the inserted portion 74 when the position of the pivot axis 65 of the hinge body 60 is at a predetermined position. Here, the pivot axis 65 of the hinge body 60 at the predetermined position is referred to as a reference pivot axis 65A (FIG. 10).

The first engagement holder 71 includes an introduction portion (hereinafter referred to as "first introduction portion") 71a that comes into contact with the second engagement holder 72 when the pivot axis 65 of the hinge body 60 is positioned at the reference pivot axis 65A between the housing body 40 side and the lid body 50 side, and guides the second engagement holder 72 so that the claw portion 73 is inserted into the inserted portion 74 as the pivoting motion of the lid body 50 with respect to the housing body 40 proceeds (FIGS. 4, 6 and 7 to 10). The first introduction portion 71a is formed as a sliding contact surface that guides the contacted second engagement holder 72 while keeping the contact state until the claw portion 73 is inserted into the inserted portion 74.

The first introduction portion 71a is formed to come into contact with the claw portion 73 of the second engagement holder 72 when the hinge body 60 makes the lid body 50 pivot with respect to the housing body 40 with the reference pivot axis 65A, and guide the claw portion 73 to the inserted portion 74 while keeping the contact state as the pivoting motion of the lid body 50 proceeds. Therefore, in the first engagement holder 71 of this embodiment, the first introduction portion 71a is provided in continuation with the inserted portion 74, and the surface on the first introduction portion 71a side among the plurality of wall surfaces forming the inserted portion 74 becomes the wall surface 74a on which the claw portion 73 is hooked.

In addition, the first introduction portion 71a in this embodiment includes a first sliding contact surface $71a_1$ that is a main guiding surface of the second engagement holder 72, and a second sliding contact surface $71a_2$ that facilitates the introduction of the second engagement holder 72 (FIGS. 7 to 10). In this first introduction portion 71a, a guiding direction of the claw portion 73 along the first sliding contact surface $71a_1$ is a main guiding direction of the second engagement holder 72. The first sliding contact surface $71a_1$ in this example is formed so as to guide the second engagement holder 72 together with the claw portion 73 along an axial direction of the electrode terminal 122. The second sliding contact surface $71a_2$ is a portion with which the second engagement holder 72 first comes into contact, and is arranged on a side opposite to the inserted portion 74 with respect to the first sliding contact surface $71a_1$. The second sliding contact surface $71a_2$ is desirably formed as an inclined surface which is inclined so as to approach the hinge body 60 side as the second sliding contact surface $71a_2$ moves away from the inserted portion 74.

In this holding mechanism 70, at least one of the first engagement holder 71 and the second engagement holder 72 has flexibility. In this holding mechanism 70, at least one of the first engagement holder 71 and the second engagement holder 72 is warped when the claw portion 73 is guided along the first introduction portion 71a. The first engagement holder 71 and the second engagement holder 72 are formed so that the warp is canceled as the claw portion 73 is inserted into the inserted portion 74.

In the holding mechanism 70 configured as described above, in order to create an engagement state between the first engagement holder 71 and the second engagement holder 72, it is necessary to displace the position of the pivot axis 65 of the hinge body 60 eventually to the position of the reference pivot axis 65A as the pivoting motion proceeds, and guide the second engagement holder 72 by the first introduction portion 71a of the first engagement holder 71 regardless of the position of the pivot axis 65 of the hinge body 60 when the pivoting motion toward the closing position of the lid body 50 with respect to the housing body 40 is started. In other words, in this holding mechanism 70, regardless of the position of the pivot axis 65 of the hinge body 60, it is necessary to guide the second engagement holder 72 to the first introduction portion 71a of the first engagement holder 71. The first engagement holder 71 includes a second introduction portion 71b that comes into contact with the second engagement holder 72 even if the pivot axis 65 of the hinge body 60 is positioned at any position between the housing body 40 side and the lid body 50 side, and guides the second engagement holder 72 to the first introduction portion 71a as the pivoting motion of the lid body 50 with respect to the housing body 40 proceeds (FIGS. 4, 6 and 7 to 10). The second introduction portion 71b is formed as a sliding contact surface that guides the contacted second engagement holder 72 while keeping the contact state until the second engagement holder 72 reaches the first introduction portion 71a.

Figure 11:
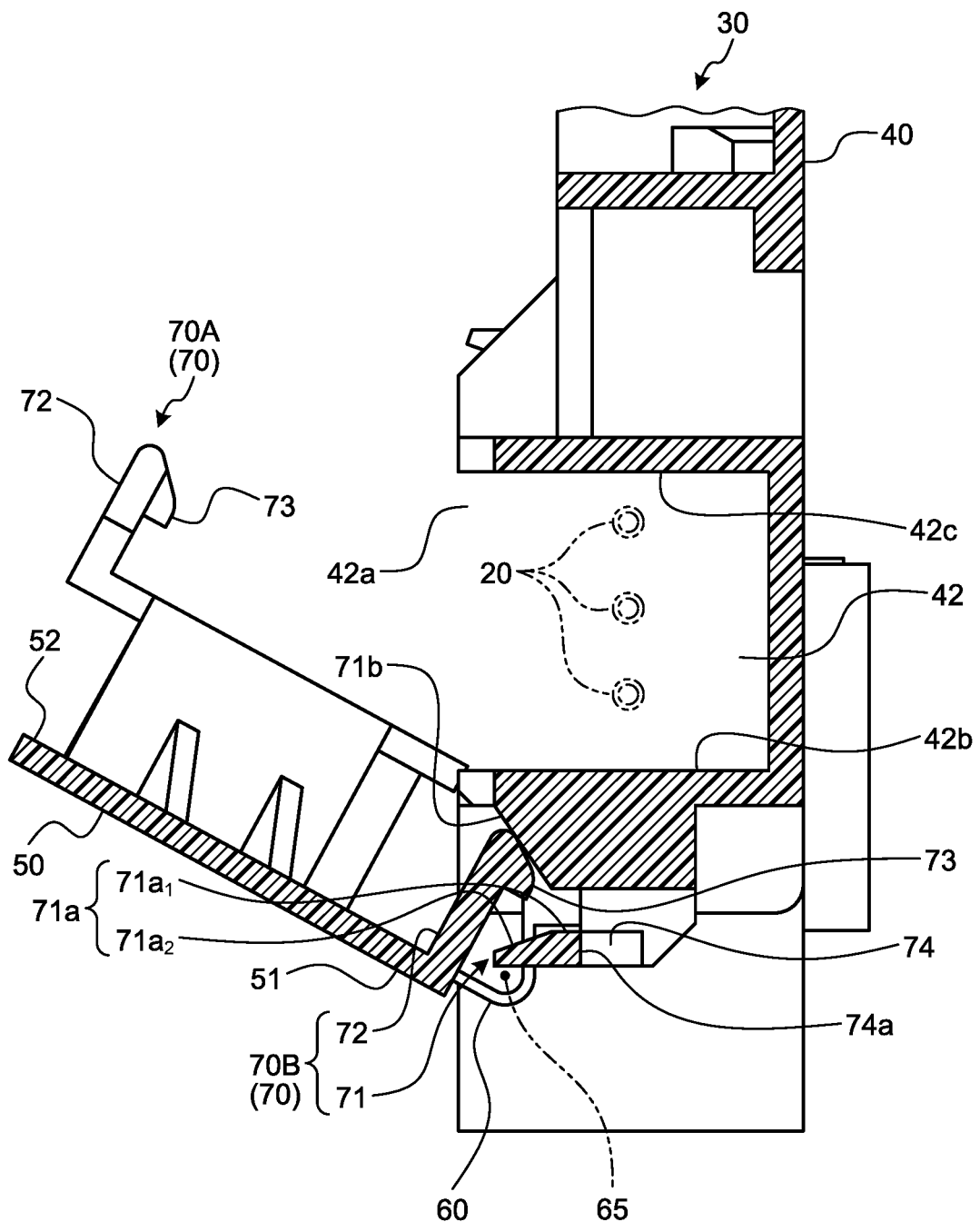
FIG. 11 is a cross-sectional view corresponding to FIG. 8 and FIG. 10, illustrating an example when a second engagement holder comes into contact with a second introduction portion.

The second introduction portion 71b in this example is formed so that the second engagement holder 72 first comes into contact with the second introduction portion 71b when the lid body 50 is made to pivot toward the closing position with respect to the housing body 40. Therefore, regardless of the position of the pivot axis 65 of the hinge body 60, the second introduction portion 71b is formed so as to be arranged on a pivoting locus of the second engagement holder 72 corresponding to all of the pivot axis 65 (FIG. 11). In this example, the second introduction portion 71b is provided in accordance with the pivoting locus of the tip of the second engagement holder 72 on the claw portion 73 side.

Further, the second introduction portion 71b is formed as an inclined surface inclined with respect to a guiding direction (a guiding direction along the first sliding contact surface $71a_1$) of the second engagement holder 72 by the first introduction portion 71a. The second introduction portion 71b in this example is an inclined surface in a direction opposite to the second sliding contact surface $71a_2$, and is inclined away from the hinge body 60 as the second introduction portion 71b moves away from the inserted portion 74 and the first introduction portion 71a in the guiding direction of the second engagement holder 72.

In this holding mechanism 70, regardless of the position of the pivot axis 65 of the hinge body 60 when the pivoting motion toward the closing position of the lid body 50 with respect to the housing body 40 is started, the second engagement holder 72 comes into contact with the second introduction portion 71b as the pivoting motion proceeds. Therefore, in the holding mechanism 70, the second engagement holder 72 is guided along the second introduction portion 71b by further making the pivoting motion proceed, so that the claw portion 73 of the second engagement holder 72 can be brought into contact with the first introduction portion 71a. Accordingly, in the holding mechanism 70, the claw portion 73 can be guided to the inserted portion 74 along the first introduction portion 71a by further making the pivoting motion proceed. As described above, in the holding mechanism 70, even if the pivot axis 65 of the hinge body 60 is displaced to any position between the housing body 40 side and the lid body 50 side, since the second engagement holder 72 can be guided to the first introduction portion 71a of the first engagement holder 71, it is possible to insert the claw portion 73 into the inserted portion 74 and create an engagement state between the first engagement holder 71 and the second engagement holder 72. Therefore, this conductive module 1 of the present embodiment has a configuration in which even if an operator or the like is not aware of the mutual positional relationship between the first introduction portion 71a of the first engagement holder 71 and the second engagement holder 72, since the claw portion 73 can be inserted into the inserted portion 74, it is possible to improve the workability of the engagement operation between the first engagement holder 71 and the second engagement holder 72 in the holding mechanism 70.

Here, in the housing member 30, in order to hold the function of the lid body 50 as the lid by the holding mechanism 70, it is desirable to arrange the holding mechanism 70 at least between the outer wall portion 42c of the second housing chamber 42 and the outer end portion 52 of the lid body 50 on the opposite side to the pivot axis 65 side to which the hinge body 60 is connected. Upon arrangement, the holding mechanism 70 determines the arrangement location and the number according to the length of the outer end portion 52 of the lid body 50. For example, if the outer end portion 52 of the lid body 50 is short and it is possible to secure holding force in the engaged state only at one position, one holding mechanism 70 is arranged between the outer wall portion 42c and the outer end portion 52, and if the outer end portion 52 of the lid body 50 is long and it is impossible to secure the holding force in the engaged state only at one position, the plurality of holding mechanisms 70 may be arranged between the outer wall portion 42c and the outer end portion 52.

In this exemplary housing member 30, the holding mechanism 70 is arranged between the outer wall portion 42c and the outer end portion 52, and is also arranged between the inner wall portion 42b of the opening 42a of the second housing chamber 42 and the inner end portion 51 of the lid body 50. Here, the holding mechanism 70 arranged between the outer wall portion 42c and the outer end portion 52 is referred to as a first holding mechanism 70A, and the holding mechanism 70 arranged between the inner wall portion 42b and the inner end portion 51 is referred to as a second holding mechanism 70B (FIG. 1, FIG. 3 to FIG. 6). In the first holding mechanism 70A, the first engagement holder 71 is provided on the outer wall portion 42c, and the second engagement holder 72 is provided on the outer end portion 52. On the other hand, in the second holding mechanism 70B, the first engagement holder 71 is provided on the inner wall portion 42b, and the second engagement holder 72 is provided on the inner end portion 51.

In the conductive module 1 of the present embodiment, in one of the first holding mechanism 70A and the second holding mechanism 70B, the second engagement holder 72 is guided to the first introduction portion 71a via the second introduction portion 71b, and in the other of the first holding mechanism 70A and the second holding mechanism 70B, the second engagement holder 72 is also guided to the first introduction portion 71a via the second introduction portion 71b. Therefore, this conductive module 1 of the present embodiment has a configuration in which even if an operator or the like is not aware of the mutual positional relationship between the first introduction portion 71a of the first engagement holder 71 and the second engagement holder 72 in each of the first holding mechanism 70A and the second holding mechanism 70B, since the claw portion 73 can be inserted into the inserted portion 74, it is possible to improve the workability of the engagement operation between the first engagement holder 71 and the second engagement holder 72 in each of the first holding mechanism 70A and the second holding mechanism 70B. In addition, in this conductive module 1, even if the first engagement holder 71 and the second engagement holder 72 are engaged from either the first holding mechanism 70A or the second holding mechanism 70B, it is possible to engage the first engagement holder 71 and the second engagement holder 72 of each of the first holding mechanism 70A and the second holding mechanism 70B; therefore, from this viewpoint also, the workability of the engagement work can be improved.

Incidentally, the second introduction portion 71b may be provided on at least one of the first holding mechanism 70A and the second holding mechanism 70B. In thus configured conductive module 1 of the present embodiment, in one of the first holding mechanism 70A and the second holding mechanism 70B, the second engagement holder 72 is guided to the first introduction portion 71a via the second introduction portion 71b, so that even if the other of the first holding mechanism 70A and the second holding mechanism 70B does not have the second introduction portion 71b, the second engagement holder 72 of the other is guided to the first introduction portion 71a. Therefore, even if the first holding mechanism 70A and the second holding mechanism 70B are configured as described above, this conductive module 1 of the present embodiment has a configuration in which even if an operator or the like is not aware of the mutual positional relationship between the first introduction portion 71a of the first engagement holder 71 and the second engagement holder 72 in each of the first holding mechanism 70A and the second holding mechanism 70B, since the claw portion 73 can be inserted into the inserted portion 74, it is possible to improve the workability of the engagement operation between the first engagement holder 71 and the second engagement holder 72 in each of the first holding mechanism 70A and the second holding mechanism 70B. In other words, even if this conductive module 1 tries to engage with the first engagement holder 71 and second engagement holder 72 of the other of the first holding mechanism 70A and the second holding mechanism 70B, which does not have the second introduction portion 71b, the second engagement holders 72 of the one of the first holding mechanism 70A and the second holding mechanism 70B is guided to the first introduction portion 71a via the second introduction portion 71b at that time; therefore, from this viewpoint also, the workability of the engagement work can be improved.

In the conductive module according to the present embodiment, in the pivoting motion toward the closing position of the lid body with respect to the housing body, even if the pivot axis of the hinge body is displaced to any position between the housing body side and the lid body side, since the second engagement holder can be introduced to a first introduction portion of the first engagement holder by a second introduction portion of the first engagement holder, it is possible to insert the claw portion of the holding mechanism into the inserted portion and to create an engagement state between the first engagement holder and the second engagement holder. Therefore, the conductive module has a configuration in which even if an operator or the like is not aware of the mutual positional relationship between the first introduction portion of the first engagement holder and the second engagement holder, since the claw portion can be inserted into the inserted portion, it is possible to improve the workability of the engagement operation between the first engagement holder and the second engagement holder in the holding mechanism.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A conductive module comprising:
a first conductive member electrically connected to one of two electrode terminals of at least one battery cell of an arranged plurality of battery cells as a connection target;
a second conductive member that has a conductor extending in a direction in which the plurality of battery cells are arranged, the second conductive member being configured to electrically connect the first conductive member and an electric connection object with the conductor; and
a housing member that houses the first and second conductive members, wherein
the housing member includes: a housing body having a first housing chamber in which the first conductive member is housed and a second housing chamber in which the second conductive member is housed; a lid body that closes at least a part of an opening of the second housing chamber so that the second conductive member does not come out from the second housing chamber; a hinge body that connects the housing body and the lid body, and rotates the lid body with respect to the housing body between an opening position of the second housing chamber with respect to the opening and a closing position of the second housing chamber with respect to the opening; and a holding mechanism that holds the lid body in the housing body at the closing position,
the hinge body is a thin living hinge having flexibility capable of displacing a position of a pivot axis between a housing body side and a lid body side,
the holding mechanism includes a first engagement holder provided in the housing body and a second engagement holder provided in the lid body, and is formed so as to hold the lid body in the housing body at the closing position by inserting a claw portion of one of the first engagement holder and the second engagement holder into an inserted portion of the other of the first engagement holder and the second engagement holder, and by hooking the claw portion and a wall surface of the inserted portion as an insertion of the claw portion into the inserted portion is completed, and
the first engagement holder includes a first introduction portion that comes into contact with the second engagement holder when the pivot axis of the hinge body is positioned at a reference pivot axis between the housing body side and the lid body side, and guides the second engagement holder so that the claw portion is inserted into the inserted portion as a pivoting motion of the lid body with respect to the housing body proceeds, and a second introduction portion that comes into contact with the second engagement holder even if the pivot axis of the hinge body is positioned at any position between the housing body side and the lid body side, and guides the second engagement holder to the first introduction portion as the pivoting motion of the lid body with respect to the housing body proceeds.

2. The conductive module according to claim 1, wherein the second introduction portion is a sliding contact surface that guides the contacted second engagement holder while keeping a contact state until the second engagement holder reaches the first introduction portion.

3. The conductive module according to claim 1, wherein the second introduction portion is an inclined surface inclined with respect to a guiding direction of the second engagement holder by the first introduction portion.

4. The conductive module according to claim 2, wherein the second introduction portion is an inclined surface inclined with respect to a guiding direction of the second engagement holder by the first introduction portion.

5. The conductive module according to claim 1, wherein the second housing chamber includes an inner wall portion that faces toward the pivoting axis, the hinge body at a wall portion forming the second housing chamber being connected to the inner wall portion, and an outer wall portion that is disposed with a space therebetween across an interior of the second housing chamber with respect to the inner wall portion,
the lid body includes an inner end portion that faces toward the pivoting axis to which the hinge body is connected, and an outer end portion arranged with a space from the inner end portion, and
in the holding mechanism, the first engagement holder is provided on the outer wall portion, and the second engagement holder is provided at the outer end portion.

6. The conductive module according to claim 2, wherein the second housing chamber includes an inner wall portion that faces toward the pivoting axis, the hinge body at a wall portion forming the second housing chamber being connected to the inner wall portion, and an outer wall portion that is disposed with a space therebetween across an interior of the second housing chamber with respect to the inner wall portion,
the lid body includes an inner end portion that faces toward the pivoting axis to which the hinge body is connected, and an outer end portion arranged with a space from the inner end portion, and
in the holding mechanism, the first engagement holder is provided on the outer wall portion, and the second engagement holder is provided at the outer end portion.

7. The conductive module according to claim 3, wherein the second housing chamber includes an inner wall portion on a side of that faces toward the pivoting axis, the hinge body at a wall portion forming the second housing chamber being connected to the inner wall portion, and an outer wall portion that is disposed with a space therebetween across an interior of the second housing chamber with respect to the inner wall portion,
the lid body includes an inner end portion on a side of that faces toward the pivoting axis to which the hinge body is connected, and an outer end portion arranged with a space from the inner end portion, and
in the holding mechanism, the first engagement holder is provided on the outer wall portion, and the second engagement holder is provided at the outer end portion.

8. The conductive module according to claim 1, wherein the second housing chamber includes an inner wall portion that faces toward the pivoting axis, the hinge body at a wall portion forming the second housing chamber being connected to the inner wall portion, and an outer wall portion that is disposed with a space therebetween across an interior of the second housing chamber with respect to the inner wall portion,
the lid body includes an inner end portion that faces toward the pivoting axis to which the hinge body is connected, and an outer end portion arranged with a space from the inner end portion, and the holding mechanism is arranged between the outer wall portion and the outer end portion and is also arranged between the inner wall portion and the inner end portion.

9. The conductive module according to claim 2, wherein
the second housing chamber includes an inner wall portion that faces toward the pivoting axis, the hinge body at a wall portion forming the second housing chamber being connected to the inner wall portion, and an outer wall portion that is disposed with a space therebetween across an interior of the second housing chamber with respect to the inner wall portion, the lid body includes an inner end portion that faces toward the pivoting axis to which the hinge body is connected, and an outer end portion arranged with a space from the inner end portion, and the holding mechanism is arranged between the outer wall portion and the outer end portion and is also arranged between the inner wall portion and the inner end portion.

10. The conductive module according to claim 3, wherein
the second housing chamber includes an inner wall portion that faces toward the pivoting axis, the hinge body at a wall portion forming the second housing chamber being connected to the inner wall portion, and an outer wall portion that is disposed with a space therebetween across an interior of the second housing chamber with respect to the inner wall portion, the lid body includes an inner end portion that faces toward the pivoting axis to which the hinge body is connected, and an outer end portion arranged with a space from the inner end portion, and the holding mechanism is arranged between the outer wall portion and the outer end portion and is also arranged between the inner wall portion and the inner end portion.

11. The conductive module according to claim 1, wherein
the second conductive member is an electric wire including a core wire as the conductor and a coating covering the core wire.

12. The conductive module according to claim 2, wherein
the second conductive member is an electric wire including a core wire as the conductor and a coating covering the core wire.

13. The conductive module according to claim 3, wherein
the second conductive member is an electric wire including a core wire as the conductor and a coating covering the core wire.

14. The conductive module according to claim 5, wherein
the second conductive member is an electric wire including a core wire as the conductor and a coating covering the core wire.

15. The conductive module according to claim 8, wherein
the second conductive member is an electric wire including a core wire as the conductor and a coating covering the core wire.

* * * * *